United States Patent
Tanaka et al.

(10) Patent No.: US 7,429,912 B2
(45) Date of Patent: Sep. 30, 2008

(54) METHOD FOR MULTI-READING A PLURALITY OF IDS

(75) Inventors: Takashi Tanaka, Tokyo (JP); Sachihiko Kobori, Tokyo (JP); Hidesuke Okada, Tokyo (JP)

(73) Assignee: LSI Japan Co., Ltd., Tokyo (JP)

( * ) Notice: Subject to any disclaimer, the term of this patent is extended or adjusted under 35 U.S.C. 154(b) by 342 days.

(21) Appl. No.: 10/517,316

(22) PCT Filed: Jul. 3, 2003

(86) PCT No.: PCT/JP03/08504

§ 371 (c)(1),
(2), (4) Date: Dec. 17, 2004

(87) PCT Pub. No.: WO2004/006457

PCT Pub. Date: Jan. 15, 2004

(65) Prior Publication Data

US 2006/0017544 A1    Jan. 26, 2006

(30) Foreign Application Priority Data

Jul. 4, 2002    (JP)    ............................. 2002-195565

(51) Int. Cl.
*H04Q 5/22*    (2006.01)
*G08B 13/14*    (2006.01)
*G08C 19/00*    (2006.01)

(52) U.S. Cl. .................. 340/10.1; 340/10.2; 340/10.31; 340/572.4; 340/825.69; 340/825.72

(58) Field of Classification Search ................ 340/10.2, 340/1, 10.32, 10.51, 10.34, 10.5, 10.42, 572.4, 340/825.69, 572.2, 3, 572.7, 10.1, 10.31, 340/825.72; 342/42, 44; 235/375, 385; 370/437

See application file for complete search history.

(56) References Cited

U.S. PATENT DOCUMENTS 5,266,925 A * 11/1993 Vercellotti et al. .......... 340/505

(Continued)

FOREIGN PATENT DOCUMENTS

JP    09-223201    8/1997

(Continued)

OTHER PUBLICATIONS

English Language Abstract of JP 2001-168759.

(Continued)

*Primary Examiner*—Brian Zimmerman
*Assistant Examiner*—Nam V Nguyen
(74) *Attorney, Agent, or Firm*—Greenblum & Bernstein, P.L.C.

(57) ABSTRACT

A interrogator 1 specifies the maximum read range ($S_0$, $e_0$) in which IDs to be read may exist (Step S1), and the interrogator 1 transmits a read request command to transponders 2 (Step S2). When there is/are a response/responses, it is judged if the response(s) is/are from a single transponder 2 or multiple transponders 2 (Step S5). When identifying multiple responses, an exponent e of the read range (S, e) is updated to $e'=e-1$ (Step S6). When identifying a single response, ID of the transponder 2 that responded is read out (Step S8) and the start S of the read range (S, e) is updated to $S'=S+d$ ($=2^e$) (Step S9). When a previous response flag F is not set to "multiple responses received", the exponent e of the read range (S, e) is updated to $e'=e+1$ (Step S13).

4 Claims, 5 Drawing Sheets

U.S. PATENT DOCUMENTS

| | | | |
|---|---|---|---|
| 5,339,073 A * | 8/1994 | Dodd et al. | 340/5.61 |
| 5,489,908 A * | 2/1996 | Orthmann et al. | 340/10.32 |
| 6,072,801 A * | 6/2000 | Wood et al. | 370/437 |
| 6,177,858 B1 * | 1/2001 | Raimbault et al. | 340/10.1 |
| 6,486,769 B1 * | 11/2002 | McLean | 340/10.32 |

FOREIGN PATENT DOCUMENTS

| | | |
|---|---|---|
| JP | 10-126308 | 8/1997 |
| JP | 2000-252857 | 9/2000 |
| JP | 2001-168759 | 6/2001 |
| JP | 2003-168997 | 6/2003 |

OTHER PUBLICATIONS

English Language Abstract of JP2000-252857.
English Language Abstract of JP10-126308.
English Language Abstract of JP09-223201.
English Language Abstract of JP 2003-168997.

* cited by examiner (a)

(b)

(c)

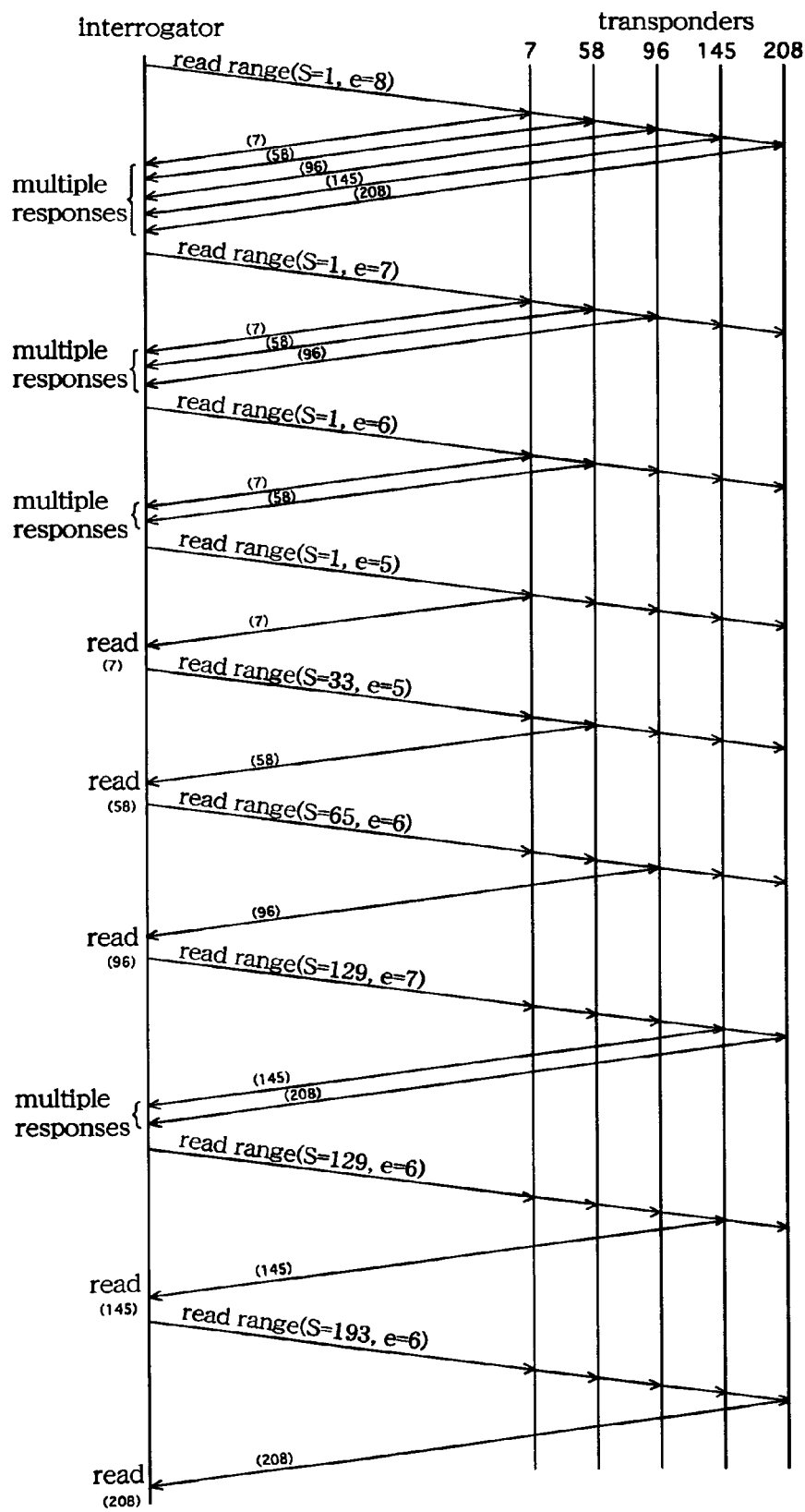

US 7,429,912 B2

METHOD FOR MULTI-READING A PLURALITY OF IDS

TECHNICAL FIELD

This invention relates to a method for multi-reading a plurality of Identifiers (IDs), wherein an interrogator and multiple transponders repeat queries and responses there between in order that the interrogator discriminates unique ID given to each one of the transponders.

BACKGROUND ART

Commercial production of Radio Frequency Identification tag (RFID tag) aiming at discriminating IDs by contactless means succeeds one another, and its application is expected in various fields, such as merchandise management, individual attestation, and forgery prevention of banknotes or negotiable securities.

Particularly when the RFID tag is utilized at cash registers in supermarkets, convenience stores etc., it will effectively reduce necessary numbers of staffs and client's waiting time at cash registers, since checkout can be instantly performed without the need for taking out goods one by one, thereby improving operational efficiency and quality of customer service.

Discernment of IDs is performed when a transponder responds its ID to a query from an interrogator, thus it is necessary to query each transponder individually. However, when multiple transponders are in the same communication area, their responses collide making it impossible to discriminate their IDs. Therefore, response requirements are specified in the queries so as to make only the transponders meeting the requirements make responses to the queries. Since there is no transponder with the same ID, the most efficient method of preventing a collision by way of setting the response requirements is to utilize IDs of the transponders themselves as response requirements.

In order to discriminate IDs by this method, the interrogator needs to query every one of existing transponders to make them respond their IDs. However, it is not practical to use this method in a place like a supermarket, where a vast quantity of goods is dealt with, because it is extremely time consuming to query IDs of all the goods in the supermarket every time a customer checkout their purchases at a cash register.

In order to solve this problem, various multi-reading methods have been proposed, but in these conventional methods, an interrogator queries the symbols 1/0 in each of the binary digits (bits) which constitute ID in order, and when its response disagrees with the query, further responses from the transponder having that ID is forbidden. The interrogator reads out IDs of the transponders that remain until the last one by one as detection numbers. For this reason, the conventional methods are problematic in that more queries become necessary as the bit length becomes long, requiring a long time to read one ID and even much longer time to read numbers of IDs of all the transponders.

Further disadvantageously, a write-in processing will be necessary on the transponders with the conventional methods in order to forbid unwanted responses, and this requires additional costs for necessary parts and overhead for the write-in processing.

One object of the present invention is therefore to provide a method for multi-reading a plurality of IDs, which can efficiently discriminate IDs in a short time even if the bit length is long, and which does not need the write-in processing on the transponders.

SUMMARY OF THE INVENTION

To attain this object, claim 1 of the present invention comprises a method for multi-reading a plurality of IDs, wherein an interrogator and multiple transponders repeat queries and responses there between in order that the interrogator discriminates unique ID given to each one of the transponders; and wherein said interrogator when querying specifies a read range of IDs, and permits a response from only the transponders whose IDs are within said read range.

The method for multi-reading a plurality of IDs according to claim 2 as described in claim 1, wherein said transponders when responding return their IDs, comprising the steps of:

1) when there is a plurality of responses to the query of said interrogator, reducing the size of said read range by half in the subsequent query;

2) when there is a single response to the query of said interrogator, reading out ID of the transponder which responded as well as shifting said read range to the following rank in the subsequent query; and further when there is a single response or no response to the previous query, expanding the size of said read range d twice; and 3) when there is no response to the query of said interrogator, shifting said read range to the following rank in the subsequent query; and further when there is a single response or no response to the previous query, expanding the size of said read range d twice;

whereby the above mentioned steps are repeated until searching of all the read ranges in which IDs to be read may exist is completed.

The method for multi-reading a plurality of IDs according to claim 3 as described in claim 1, wherein said transponders when responding returns only response signals, comprising the steps of:

1) when there is a response/responses from said transponders to the query of said interrogator, and 1.1) when the size of said read range d is not equal to 1, reducing the size of said read range d by half in the subsequent query;

1.2) when the size of said read range d is equal to 1, reading out ID of the transponder which responded as well as shifting said read range to the following rank in the subsequent query; and further when there is a response/responses to the previous query and the size of said read range d is equal to 1 or when there is no response, expanding the size of said read range d twice; and 2) when there is no response from said transponders to the query of said interrogator, shifting said read range to the following rank in the subsequent query; and further when there is a response/responses to the previous query and the size of said read range d is equal to 1 or when there is no response, expanding the size of said read range d twice;

whereby the above mentioned steps are repeated until searching of all the read ranges in which IDs to be read may exist is completed.

In the method for multi-reading a plurality of IDs according to claim 4 as described in claims 2 and 3, the size of said read range d is defined by $2^e$, i.e. the power of 2, and said read range d is specified by an integer value of either the start S or the end E of said read range d and exponent e of said read range d.

In the method for multi-reading a plurality of IDs according to claim 5 as described in claim 4, the reduction value (d/2) of the size of said read range d is calculated by exponential function, $e=e-1$.

In the method for multi-reading a plurality of IDs according to claim 6 as described in claim 4, the expansion value (2×d) of the size of said read range d is calculated by exponential function, e=e+1.

In the method for multi-reading a plurality of IDs according to claim 7 as described in claim 4, the end E of said read range is calculated by formula $E=S+2^e-1$ when said read range is specified by the start S of said read range and the exponent e.

In the method for multi-reading a plurality of IDs according to claim 8 as described in claim 4, the start S of said read range is calculated by formula $S=E-2^e+1$ when said read range is specified by the end E of said read range and the exponent e.

BRIEF DESCRIPTION OF THE DRAWINGS

FIG. 5 is a processing sequence chart of the method for multi-reading a plurality of IDs according to the present invention.

DETAILED DESCRIPTION OF THE PREFERRED EMBODIMENT

Some preferred embodiments of the present invention are described below with reference to the accompanying drawings.

Figure 1:
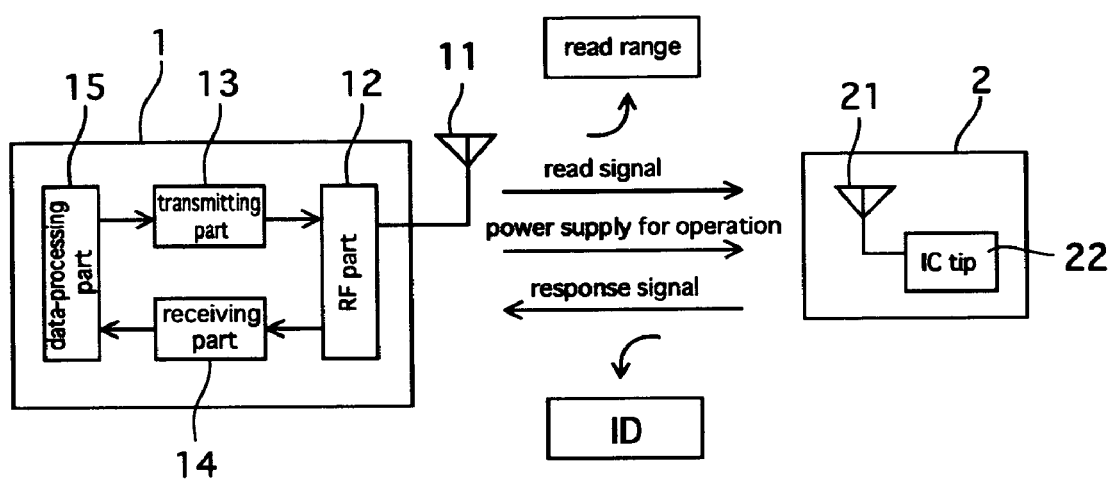
FIG. 1 is a block diagram of the multi-read system of multiple IDs according to the present invention.

A block diagram of the multi-read system of multiple IDs according to one embodiment of the present invention is shown in FIG. 1. In the multi-read system of multiple IDs, wireless data communication and electric power transmission are operated between an interrogator 1 and a transponder 2 to discriminate IDs of the transponders 2 in order. Although the system disclosed here discriminates ID given to a wireless cards and RFID tags etc., the multi-read system of the present invention is not limited thereto, but it is also applicable to other systems which discriminate telephone numbers of cellular phones in a service area, IDs given to terminals linked to LAN, etc.

The interrogator 1 consists of an antenna 11; an analog circuit comprising a RF part 12, a transmitting part 13, and a receiving part 14; and a digital circuit comprising a data-processing part 15. The interrogator modulates a read signal of ID and discharges an electric wave, and conversely restores the electric wave received from the transponder 2 to take out a response signal.

The electric wave discharged from the interrogator 1 transmits not only data but also an electric power, which the transponder 2 requires.

The transponder 2 includes an antenna 21 and an IC tip 22 integrally constructed, and receives the electric wave from the interrogator 1 with the antenna 21 to generate excitation voltage, thereby obtaining a power supply for its operation by rectifying the excitation voltage.

Moreover, the transponder 2 restores the received electric wave to take out a read signal, and modulates a response signal to re-discharge the electric wave without amplifying the electric power. The multi-read system of multiple IDs is a system in which the interrogator 1 specifies a read range of ID when transmitting a read signal, and the transponder 2 returns its ID if it is within the given read range.

The transponder 2 does not voluntarily send a response signal, but passively send it upon correctly recognizing the read signal received from the interrogator 1

Consequently, the transponder 2 does not make a response in both cases when its ID is not within the given read range and when it cannot recognize the given read signal. Therefore, when multiple transponders 2 exist in the communication area of the interrogator 1, the read range of ID is so controlled that an unnecessary response is stopped and that interference and collision of the responses from the multiple transponders 2 are prevented.

Figure 2:
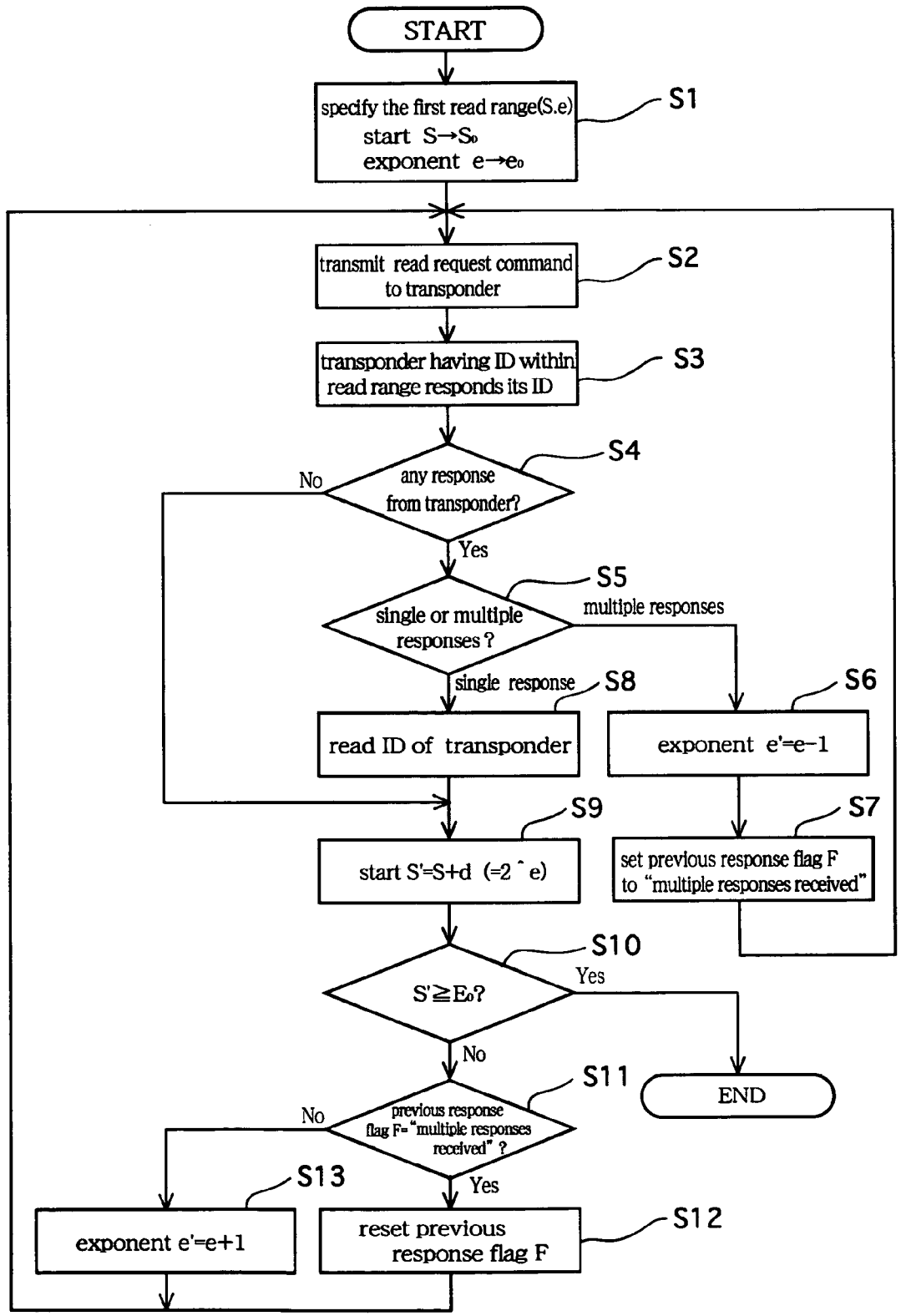
FIG. 2 is a flow chart of the method for multi-reading according to the present invention wherein the transponder returns its ID to the query of the interrogator.
Figure 3:
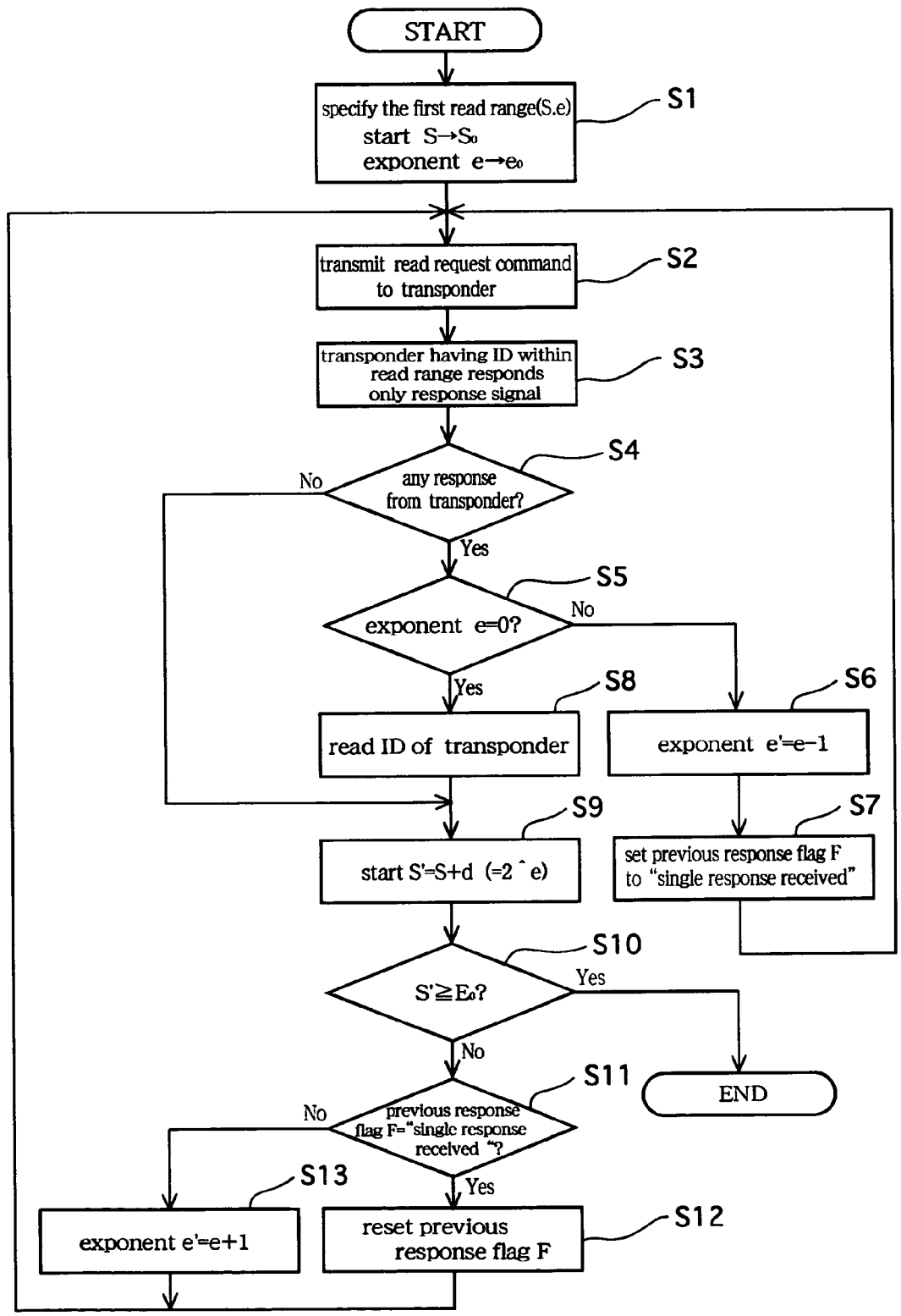
FIG. 3 is a flow chart of the method for multi-reading according to the present invention wherein the transponder returns only a response signal to the query of the interrogator.

FIGS. 2 and 3 show flow charts of preferred embodiments of the method for multi-reading a plurality of IDs according to the present invention.

FIG. 2 shows the case where the transponder 2 returns its ID to a query from the interrogator 1, and FIG. 3 shows the case where the transponder 2 returns only a response signal to a query from the interrogator 1. Upon starting the process, the interrogator 1 firstly specifies the maximum read range ($S_0$, $e_0$) in which IDs to be read may exist. (Step S1).

In order that the method for multi-reading according to the present invention makes the size of the read range d fluctuate in proportion to the power of 2, the size of the read range d is defined as $d=2^e$ for an easy operation, and the read range (S, e) is specified by the start S of the read range and an exponent e of the size of the read range d. At this time, the end E of the read range is calculated by an equation, $E=S+2^e-1$.

Moreover, the exponent e expresses bit length of ID, for example, it means that e=16 corresponds to ID with 16 bits, e=32 corresponds to ID with 32 bits, e=64 corresponds to ID with 64 bits, and e=128 corresponds to ID with 128 bits.

If the read range (S, e) is initially specified by the start S of the read range as $S_0=1$, and the exponent e as $e_0=12$, for example, the end E of the read range will be $E_0=1+2^{12}-1=4096$, and so the maximum read range initially specified will be from 1 to 4096.

Alternatively, if the start S of the read range is initially specified as $S_0=10001$, for example, the minimum limit of the read range (S, e) can be set at more than 10001. In addition to these means, the read range may be specified by setting the start S and the end E of the read range, or by setting the end E of the read range and the exponent e of the size of the read range d.

Next, the interrogator 1 transmits a read request command to the transponder 2 (Step S2). When the read request command is transmitted, the transponder 2 calculates the end E of the read range by an equation $E=S+2^e-1$ with reference to the read range (S, e) of the read request command so as to judge whether its ID is within the read range (S≦ID≦E), and when it is within the read range, the transponder 2 responds its ID (or a response signal in the case of FIG. 3) (Step S3).

Then, the interrogator 1 judges whether there is any response from the transponder 2 (Step S4): when there is no response, it progresses to Step S9, and when there is one or more responses, it judges whether the response(s) is/are from a single transponder 2 or multiple transponders 2. (In the case of FIG. 3, the interrogator judges whether the exponent e=0) (Step S5). Whether the response(s) is/are a singular or plural can be judged by checking a cyclic check code (CRC) etc, since a disorder arises in a bit pattern of the received signal when plural responses overlap: when an error is detected in the bit pattern, it is judged that there were plural responses.

When the interrogator 1 recognizes multiple responses in Step S5 (when it detects the exponent e≠0 in the case of FIG. 3), it updates the exponent e of the read range (S, e) to e' (the exponent after updating)=e (the exponent before updating)−1 (Step S6), and also sets a previous response flag F to "multiple responses received" (to "single response received" in the case of FIG. 3) (Step S7), then returns to Step S2 to transmits the subsequent read request command.

Figure 4:
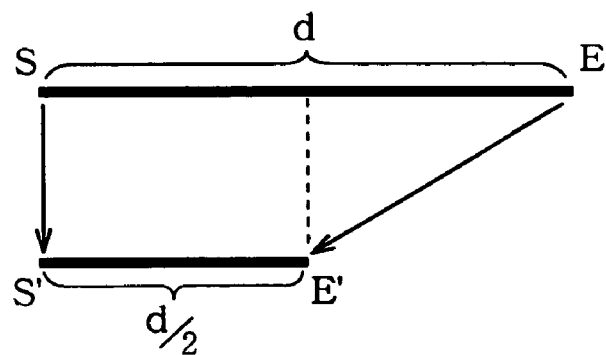
FIGS. 4(a), 4(b), and 4(c) show hoe the read range changes in the Sequential read commands.
Figure 4:
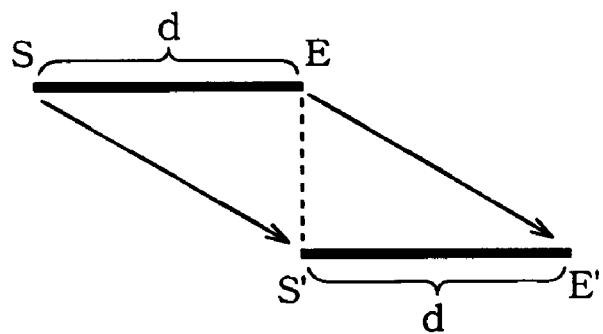
Figure 4:
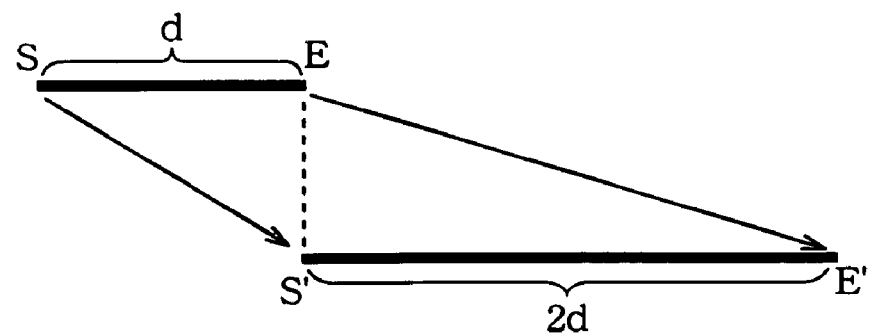

By the processing of Step S6, the read range (S, e) in the subsequent read request command is set to d' (the size of the read range after updating)=d (the size of the read range before updating)/2 as shown in FIG. 4 (*a*), reducing the size of the read range d by half than the previous time. Accordingly, E' (the end of the read range after updating) is shifted down from E (the end of the read range before updating) by the size of the read range d/2 only.

When the interrogator 1 recognizes a single response in Step S5 (when detects the exponent e=0 in the case of FIG. 3), it reads out ID of the transponder 2 which responded (Step S8), and updates the start S of the read range (S, e) to S' (the start of the read range after updating)=S (the start of the read range before updating)+d ($=2^e$) (Step S9).

Then, S' (the start of the read range after updating) is compared with $E_0$, the end of the read range initially specified as $E_0=S_0+2^{e0}-1$ (Step S10), and if it is $S' \geq E_0$, it is judged that the read range initially specified is all searched and the interrogator 1 terminates its operation.

If it is not $S' \geq E_0$, the interrogator 1 determines whether the previous response flag F is set to "multiple responses received" (or "single response received" in the case of FIG. 3) (Step S11), and when it is "multiple responses received"(or "single response received" in the case of FIG. 3), the interrogator 1 resets the previous response flag F (Step S12) and returns to Step S2 to transmits the subsequent read request command.

By the processing of Step S9, the read range (S, e) in the subsequent read request command is set to S' (the start of the read range after updating)=S (the start of the read range before updating)+d, as shown in FIG. 4 (*b*), and the start of the read range S is shifted up only for the size of the read range d than the previous time. At this time, it turns out that S'=S+d=E +1 since the end of the read range E=S+d−1, i.e. S' (the start of the read range after updating) is shifted to the position where 1 is added to E (the end of the read range before updating). Accordingly, E' (the end of the read range after updating) is also shifted up only for the size of the read range d from E (the end of the read range before updating).

When the previous response flag F is not set to "multiple responses received" (or "single response received" in the case of FIG. 3) in Step S11, the interrogator 1 updates the exponent e of the read range (S, e) to e' (the exponent after updating)=e (the exponent before updating)+1 (Step S13), and then returns to Step S2 to transmit the subsequent read request command.

By the processing of Step S13, the read range (S, e) in the subsequent read request command is set to d' (the size of the read range after updating)=2d (the size of the read range before updating) as shown in FIG. 4 (*c*), and the size of the read range d is expanded twice than the previous time.

Accordingly, E' (the end of the read range after updating) is shifted up only for the size of the read range 2d from E (the end of the read range before updating). In addition, although the discrimination of IDs in the above explanation is performed by shifting the read range (S, e) in ascending order, it can be also performed in the opposite way by shifting the read range (S, e) in descending order.

More particular processing sequence chart of the method for multi-reading a plurality of IDs is shown in FIG. 5. In this embodiment, IDs of five transponders 2 selected at random are read in order, and each of the IDs is referred to as 7, 58, 96, 145, and 208, respectively. The transponders 2 return their IDs to the query from the interrogator 1.

The interrogator 1 specifies the read range (S=1, e=8) first. This makes the end of the read range $E_0=S_0+2^{e0}-1=1+2^8-1=256$, and the interrogator 1 transmits the read request command for the read ranges 1~256 to the transponders 2. All the transponders 2 respond to this command.

Then the interrogator 1, having received multiple responses, changes the exponent e to e−1=7, and specifies the read range (S=1, e=7). This makes the end of the read range $E=S+2^e-1=1+2^7-1=128$, and the interrogator 1 transmits the read request command for the read ranges 1~128 to the transponders 2. The transponders 2 referred to as 7, 58, and 96 respond to this command.

The interrogator 1, having received multiple responses again, changes the exponent e to e−1=6, and specifies the read range (S=1, e=6). This makes the end of the read range $E=S+2^e-1=1+2^6-1=64$, and the interrogator 1 transmits the read request command for the read ranges 1~64 to the transponders 2. The transponders 2 referred to as 7 and 58 respond to this command.

Next, the interrogator 1, yet having received multiple responses, changes the exponent e to e−1=5, and specifies the read range (S=1, e=5). This makes the end of the read range $E=S+2^e-1=1+2^5-1=32$, and the interrogator 1 transmits the read request command for the read ranges 1~32 to the transponders 2. The transponder 2 referred to as 7 only responds to this command.

Since the interrogator 1 now has a single response here, it reads out 7 as a detection number and changes the start of the read range S to $S=S+2^e=1+2^5=1+32=33$ so as to specify the read range (S=33,e=5). This makes the end of the read range $E=S+2^e-1=33+2^5-1=64$, and the interrogator 1 then transmits the read request command for the read ranges 33~64 to the transponders 2. The transponder 2 referred to as 58 only responds to this command.

Since the interrogator 1 has a single response, it reads out 58 as a detection number, and changes the start of the read range S to $S=S+2^e=33+2^5=33+32=65$. Moreover, since the previous response flag F is not set to "multiple responses received", the interrogator 1 then changes the exponent e to e+1=6 and specifies the read range (S=65, e=6). This makes the end of the read range $E=S+2^e-1=65+2^6-1=65+64-1=128$, and the interrogator 1 then transmits the read request command for the read ranges 65~128 to the transponders 2.

The transponder 2 referred to as 96 only responds to this command. Since the interrogator 1 has a single response, it reads out 96 as a detection number, then changes the start of the read range S to $S=S+2^e=65+2^6=65+64=129$.

Moreover, since the previous response flag F is not set to "multiple responses received", the interrogator 1 then changes the exponent e to e+1=7, and specifies the read range (S=129, e=7). This makes the end of the read range $E=S+2^e-1=129+2^7-1=129+128-1=256$, and the interrogator 1 then transmits the read request command for the read ranges 129~256 to the transponders 2. The transponders 2 referred to as 145 and 208 respond to this command.

Next, the interrogator 1, having received multiple responses, changes the exponent e to e−1=6 and specifies the read range (S=129, e=6). This makes the end of the read range $E=S+2^e-1=129+2^6-1=192$, and the interrogator 1 then transmits the read request command for the read ranges 129~192 to the transponders 2. The transponder 2 referred to as 145 only responds to this command.

Since the interrogator 1 now has a single response, it reads out 145 as a detection number, and then changes the start of the read range S to $S=S+2^e=129+2^6=129+64=193$ so as to specify the read range (S=193, e=6). This makes the end of the read range $E=S+2^e-1=193+2^6-1=256$, and the interrogator 1 then transmits the read request command for the read ranges 193~256 to the transponders 2. The transponder 2 referred to as 208 only responds to this command. Since the interrogator 1 now has a single response, it reads out 208 as a detection number, and then changes the start of the read range S to $S=S+2^e=193+2^6=193+64=257$. The start of the read range S=257 thereby exceeds the end of the read range $E_0=256$ as initially specified, thus all reading processes are completed at this point.

INDUSTRIAL APPLICABILITY

According to the present invention as explained above, the interrogator does not query the symbols 1/0 of each bit of ID one by one as in the conventional method, but it specifies the read range and queries only whether ID is within the read range or not, so it is not necessary to repeat a query repeatedly with the present invention. Since one query is sufficient with the present invention, discernment of ID can be performed efficiently in a short time irrespective of a bit length of ID.

Moreover, the interrogator does not selectively forbid a response from the transponders whose bit code of IDs do not agree as in the conventional method, but forbids responses from the transponders whose IDs are out of the read range all together. Therefore, a write-in processing on the transponders is not needed, thereby reducing costs for additional parts and overhead required for the write-in processing.

Furthermore, the process of searching IDs according to the present invention only consists of a step of shifting the read range to the subsequent rank in accordance with responses from the transponders, and a step of reducing the size of the read range by half or expanding it twice so that ID can be searched by the binary search method with a program of simple loop structure.

Generally, when programming searching process of ID by the binary search method, it is necessary to record history information in the process of subdividing the read range, and after completing the process with the subdivided read range, it is necessary to return control to the original read range with reference to this history information. For this reason, processing logic becomes complicated and a large amount of memories and CPUs are consumed in order to manage the history of the read range.

Moreover, when not managing the history information by the program, it becomes so-called recursive call structure program using recursive sub routine which calls itself. For this reason, program structure becomes complicated, and the overhead for evacuating and recovering the history information increases every time the sub routine is called, thereby elongating the processing time.

Consequently, according to the present invention, an efficient processing program whose structure is simple, processing step is short, and consumption of a memory and CPU is small is realized. Moreover, since the present invention searches ID by shifting the read range in ascending or descending orders, IDs are detected in ascending or descending orders thereby getting rid of a sorting process after the searching operation.

Moreover, since the present invention defines the size of the read range by $2^e$, i.e. the power of 2, it will only need 3 bits to specify 64-bit ID with the exponent e as $2^6=64$, which would otherwise need whole 64 bits. Thus, the amount of data to transmit at a query is sharply reducible.

Furthermore, the present invention allows a high-speed operation by the shift register, since calculation of the reduction value (d/2) of the size of the read range d or the expansion value (2×d) of the size of the read range d can be calculated by an easy subtraction and addition.

The invention claimed is:

1. A method for multi-reading a plurality of IDs, by which an interrogator and multiple transponders repeat queries and responses there-between in order to allow the interrogator to discriminate a unique ID given to each one of the transponders, the method comprising:

specifying, by the interrogator, a first read range of IDs in a first query;

responding, by a transponder, with an ID of the transponder, if the transponder has an ID within the first read range of IDs;

transmitting, by the interrogator, a second query specifying a second read range of IDs which is half a size of the first read range of IDs, if the interrogator receives a plurality of responses to the first query;

reading an ID of a responding transponder, if the interrogator receives a single response to the first query; and if the interrogator does not receive a response to the first query, or receives only a single response to the first query, transmitting, by the interrogator, a second query specifying a second read range of IDs which is twice a size of the first read range of IDs, the second read range of IDs having a starting ID differing from a starting ID of the first read range of IDs, wherein the method is repeated until a search for all possibly existing IDs has been completed, the sizes of the first and second read ranges are defined by powers of two, the first and second read ranges are specified by one of a start value and an end value, and an exponent value which sets a size of a read range of IDs, and an end value E of a read range is calculated by the formula $E=S+2^e-1$ when the read range is specified by a start value S of the read range and an exponent value e.

2. A method for multi-reading a plurality of IDs, by which an interrogator and multiple transponders repeat queries and responses there-between in order to allow the interrogator to discriminate a unique ID given to each one of the transponders, the method comprising:

specifying, by the interrogator, a first read range of IDs in a first query;

responding, by a transponder, with an ID of the transponder, if the transponder has an ID within the first read range of IDs;

transmitting, by the interrogator, a second query specifying a second read range of IDs which is half a size of the first read range of IDs. if the interrogator receives a plurality of responses to the first query;

reading an ID of a responding transponder, if the interrogator receives a single response to the first query; and if the interrogator does not receive a response to the first query, or receives only a single response to the first query, transmitting, by the interrogator, a second query specifying a second read range of IDs which is twice a size of the first read range of IDs, the second read range of IDs having a starting ID differing from a starting ID of the first read range of IDs, wherein the method is repeated until a search for all possibly existing IDs has been completed, the sizes of the first and second read ranges are defined by powers of two, the first and second read ranges are specified by one of a start value and an end value, and an exponent value which sets a size of a read range of IDs, and a start value S of a read range is calculated by the formula $S=E-2^e+1$, when the read range is specified by an end value E of the read range and an exponent value e.

3. A method for multi-reading a plurality of IDs, by which an interrogator and multiple transponders repeat queries and responses there-between in order to allow the interrogator to discriminate a unique ID given to each one of the transponders, the method comprising:

specifying, by the interrogator, a first read range of IDs in a first query;

responding, by a transponder, if the transponder has an ID within the first read range of IDs;

transmitting, by the interrogator, a second query specifying a second read range of IDs which is half a size of the first read range of IDs, if the interrogator receives a response to the first query and the first read range of IDs comprises more than a single ID;

reading an ID of a responding transponder, if the first read range of IDs comprises a single ID; and if the interrogator does not receive a response to the first query, or if the interrogator receives a response to the first query and the first read range comprises a single ID, transmitting, by the interrogator, a second query specifying a second read range of IDs which is twice a size of the first read range of IDs, the second read range of IDs having a starting ID differing from a starting ID of the first read range of IDs, wherein the method is repeated until a search for all possibly existing IDs has been completed, the sizes of the first and second read ranges are defined by powers of two, the first and second read ranges are specified by one of a start value and an end value, and an exponent value which sets a size of a read range of IDs, and an end value E of a read range is calculated by the formula $E=S+2^e-1$ when the read range is specified by a start value S of the read range and an exponent value e.

4. A method for multi-reading a plurality of IDs, by which an interrogator and multiple transponders repeat queries and responses there-between in order to allow the interrogator to discriminate a unique ID given to each one of the transponders, the method comprising:

specifying, by the interrogator, a first read range of IDs in a first query;

responding, by a transponder, if the transponder has an ID within the first read range of IDs;

transmitting, by the interrogator, a second query specifying a second read range of IDs which is half a size of the first read range of IDs, if the interrogator receives a response to the first query and the first read range of IDs comprises more than a single ID;

reading an ID of a responding transponder, if the first read range of IDs comprises a single ID; and if the interrogator does not receive a response to the first query, or if the interrogator receives a response to the first query and the first read range comprises a single ID, transmitting, by the interrogator, a second query specifying a second read range of IDs which is twice a size of the first read range of IDs, the second read range of IDs having a starting ID differing from a starting ID of the first read range of IDs, wherein the method is repeated until a search for all possibly existing IDs has been completed, the sizes of the first and second read ranges are defined by powers of two, the first and second read ranges are specified by one of a start value and an end value, and an exponent value which sets a size of a read range of IDs, and a start value S of a read range is calculated by the formula $S=E-2^e+1$, when the read range is specified by an end value E of the read range and an exponent value e.

* * * * *